United States Patent
Su et al.

(10) Patent No.: US 10,197,296 B2
(45) Date of Patent: Feb. 5, 2019

(54) AIR PURIFIER AND BLOWER DEVICE THEREOF

(71) Applicants: Xiaomi Inc., Beijing (CN); Beijing Smartmi Technology Co., Ltd., Beijing (CN)

(72) Inventors: Jun Su, Beijing (CN); Yi Wang, Beijing (CN); Zhuoli Yu, Beijing (CN); Yuya Omoto, Beijing (CN)

(73) Assignees: Xiaomi Inc., Beijing (CN); Beijing Smartmi Technology Co., Ltd., Beijing (CN)

(*) Notice: Subject to any disclaimer, the term of this patent is extended or adjusted under 35 U.S.C. 154(b) by 33 days.

(21) Appl. No.: 15/278,871

(22) Filed: Sep. 28, 2016

(65) Prior Publication Data

US 2017/0089595 A1  Mar. 30, 2017

(30) Foreign Application Priority Data

Sep. 29, 2015  (CN) .......................... 2015 1 0634781

(51) Int. Cl.
  *F24F 3/16*  (2006.01)
  *F04D 19/00*  (2006.01)
  (Continued)

(52) U.S. Cl.
  CPC .............. *F24F 3/16* (2013.01); *F04D 19/007* (2013.01); *F04D 25/02* (2013.01); *F04D 25/06* (2013.01);
  (Continued)

(58) Field of Classification Search
  CPC ................ B01D 46/10; B01D 2273/30; B01D 2279/50; F24F 3/1603; F24F 2001/0096; F24F 2221/12; F04D 19/007
  (Continued)

(56) References Cited

U.S. PATENT DOCUMENTS 2,488,945 A * 11/1949 Troller .................. F04D 19/002
  417/362
5,839,205 A * 11/1998 Hung .................... F04D 17/165
  34/97

(Continued)

FOREIGN PATENT DOCUMENTS

CN       87212676 U    3/1988
CN       2195055 Y     4/1995
  (Continued)

OTHER PUBLICATIONS

English version of International Search Report issued in Application No. PCT/CN2016/084958, from the State Intellectual Property Office of the P.R. China, dated Sep. 12, 2016.
  (Continued)

*Primary Examiner* — Duane Smith
*Assistant Examiner* — Minh Chau T Pham
(74) *Attorney, Agent, or Firm* — Finnegan, Henderson, Farabow, Garrett & Dunner LLP

(57) ABSTRACT

A blower device for use in an air purifier is disclosed. The blower device includes a first fan and a second fan which have a same air blowing direction and are arranged sequentially in the air blowing direction at an interval. The first fan and the second fan are mounted coaxially and driven synchronously by a motor.

15 Claims, 4 Drawing Sheets

(51) Int. Cl.

| | |
|---|---|
| *F04D 25/06* | (2006.01) |
| *F04D 29/32* | (2006.01) |
| *F24F 3/14* | (2006.01) |
| *F24F 7/06* | (2006.01) |
| *F24F 13/08* | (2006.01) |
| *F04D 25/02* | (2006.01) |
| *F04D 29/053* | (2006.01) |
| *F24F 7/007* | (2006.01) |
| *F24F 13/24* | (2006.01) |
| *F04D 29/54* | (2006.01) |
| *F24F 6/00* | (2006.01) |
| *B01D 46/24* | (2006.01) |

(52) U.S. Cl.
CPC ......... *F04D 29/053* (2013.01); *F04D 29/329* (2013.01); *F24F 3/14* (2013.01); *F24F 3/1603* (2013.01); *F24F 7/007* (2013.01); *F24F 7/065* (2013.01); *F24F 13/08* (2013.01); *F24F 13/24* (2013.01); *B01D 46/2403* (2013.01); *B01D 2273/30* (2013.01); *F04D 29/547* (2013.01); *F24F 2006/008* (2013.01)

(58) Field of Classification Search
USPC ........... 55/385.1, 471–473; 95/273; 415/115, 415/176, 182.1, 198.1; 417/362, 423.5
See application file for complete search history.

(56) References Cited

U.S. PATENT DOCUMENTS

| | | | | |
|---|---|---|---|---|
| 6,309,178 B1* | 10/2001 | Kim | ........................ | F01P 11/10 415/176 |
| 6,379,113 B1* | 4/2002 | Kim | ........................ | B63H 5/10 415/182.1 |
| 6,533,559 B2* | 3/2003 | Hsieh | .................... | F04D 19/002 417/220 |
| 7,896,612 B2* | 3/2011 | Schliemann | .......... | E01H 1/0809 415/198.1 |
| 2003/0150326 A1 | 8/2003 | Chasen | | |
| 2007/0286720 A1* | 12/2007 | Chang | .................. | F04D 19/007 415/198.1 |
| 2008/0124232 A1* | 5/2008 | Lee | ....................... | F04D 19/007 417/423.5 |
| 2008/0138199 A1 | 6/2008 | Chang et al. | | |
| 2014/0079536 A1 | 3/2014 | Chen et al. | | |
| 2016/0051922 A1* | 2/2016 | Horng | ................ | B01D 46/0005 55/471 |

FOREIGN PATENT DOCUMENTS

| | | |
|---|---|---|
| CN | 2884006 Y | 3/2007 |
| CN | 204115144 U | 1/2015 |
| CN | 104456772 A | 3/2015 |
| CN | 204447560 U | 7/2015 |
| CN | 204555082 U | 8/2015 |
| CN | 105221452 A | 1/2016 |
| CN | 205136069 U | 4/2016 |
| DE | 202006016932 U | 12/2006 |
| JP | 3602991 B2 | 12/2004 |
| KR | 10-1521904 B1 | 5/2015 |
| RU | 2173407 C1 | 9/2001 |
| SU | 615253 A1 | 7/1978 |
| WO | WO 2005/050026 A1 | 6/2005 |
| WO | WO 2013/153995 A1 | 10/2013 |

OTHER PUBLICATIONS

Extended European Search Report issued in European Patent Application No. 16191475.9, from the European Patent Office, dated Jan. 30, 2017.

Russian Office Action and Search Report issued in Application No. 2016131885/06(049485), from the Federal Institute of Industrial Property, dated Oct. 19, 2017.

International Search Report of PCT International Application No. PCT/CN2016/084958 dated Sep. 12, 2016, from the State Intellectual Property Office of China.

* cited by examiner

AIR PURIFIER AND BLOWER DEVICE THEREOF

CROSS-REFERENCE TO RELATED APPLICATIONS

The present application is based upon and claims priority to Chinese patent application No. 201510634781.4 filed Sep. 29, 2015, the entire contents of which are incorporated herein by reference.

TECHNICAL FIELD

The disclosure relates to the field of blower devices for use in air purifiers, and more particularly, to a blower device and an air purifier using the blower device.

BACKGROUND

In the related art, a fan is generally used as a blower device for blowing air in an air purifier. The structure of the fan affects directly the performance of the air purifier, such as blowing efficiency, noise generated, and so on.

SUMMARY OF THE INVENTION

According to a first aspect of the present disclosure, there is provided a blower device for use in an air purifier. The blower device includes a first fan and a second fan which have a same air blowing direction and are arranged sequentially in the air blowing direction at an interval. The first fan and the second fan are mounted coaxially and driven synchronously by a motor.

According to another aspect of the present disclosure, there is provided an air purifier. The air purifier includes: a purifier body; an exhaust channel provided on the purifier body; and a blower device provided in the exhaust channel, the blower device including a first fan and a second fan which have a same air blowing direction and are arranged sequentially in the air blowing direction at an interval. The first fan and the second fan are mounted coaxially and driven synchronously by a motor.

According to another aspect of the present disclosure, there is provided an air purifier. The air purifier includes: a purifier body; an exhaust channel provided on the purifier body; and a blower device provided in the exhaust channel. The blower device includes a first fan and a second fan which have a same blowing direction and are arranged sequentially in the air blowing direction at an interval. The first fan and the second fan are mounted coaxially and driven synchronously by a motor. The motor is a dual-shaft motor mounted between rotary centers of the first fan and the second fan.

It should be understood that the above general explanation and other detailed explanation are illustrative and explanative, rather than limiting the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

The orientation terms such as "up" and "down" are generally defined as an air purifier operates in normal conditions provided by the exemplary embodiments of the present disclosure unless otherwise provided. The directions shown in FIGS. 1 and 2 may be referenced for illustration. The terms "inside" and "outside" generally mean the inside and outside of the outlines of the corresponding members. The terms "far" and "near" are generally defined based on the blowing direction of an air blower, i.e., a relative distance of the air flows from the air blower.

Figure 1:
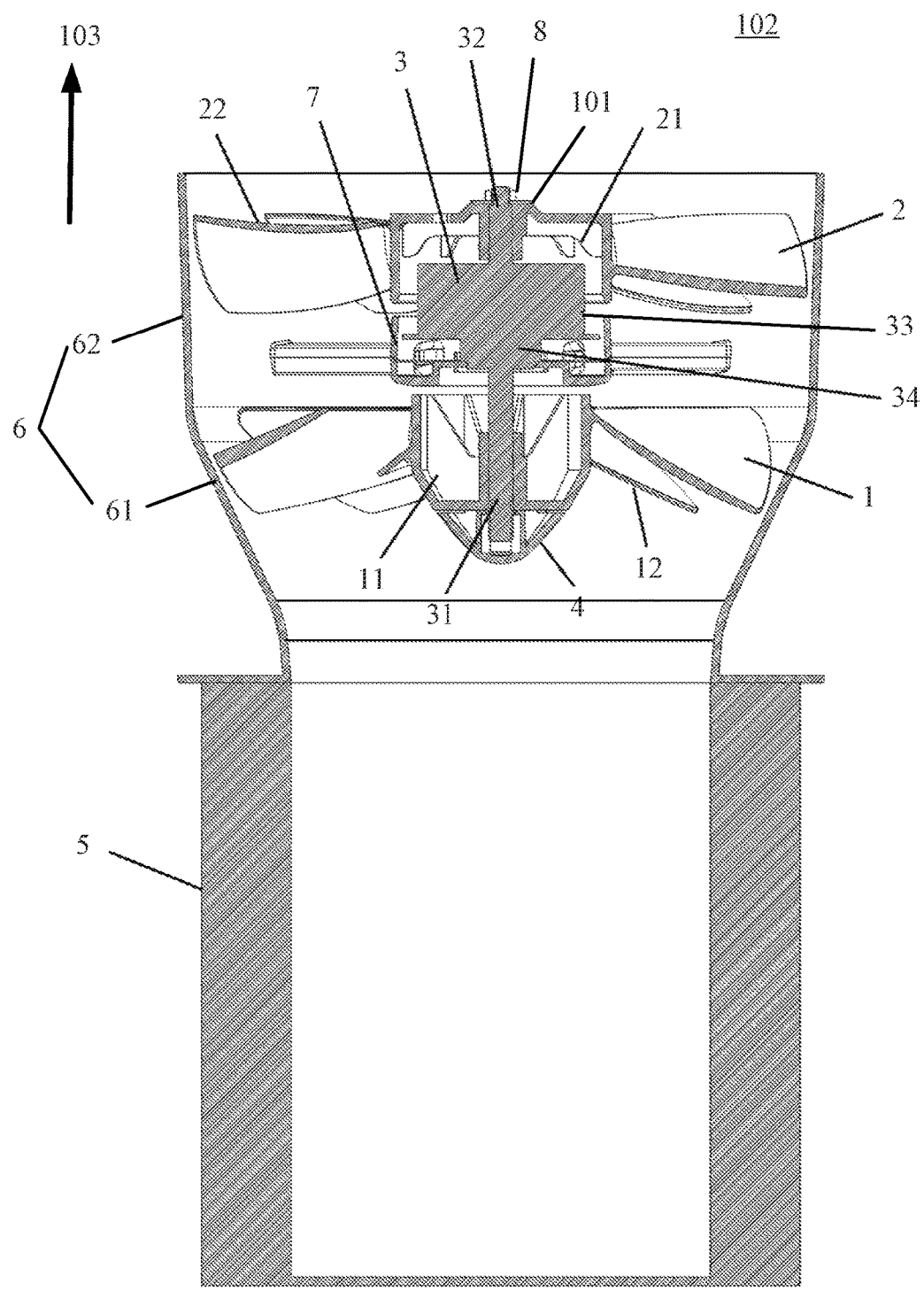
FIG. 1 is an illustrative view showing a cross-section structure of an air purifier according to an exemplary embodiment.
Figure 2:
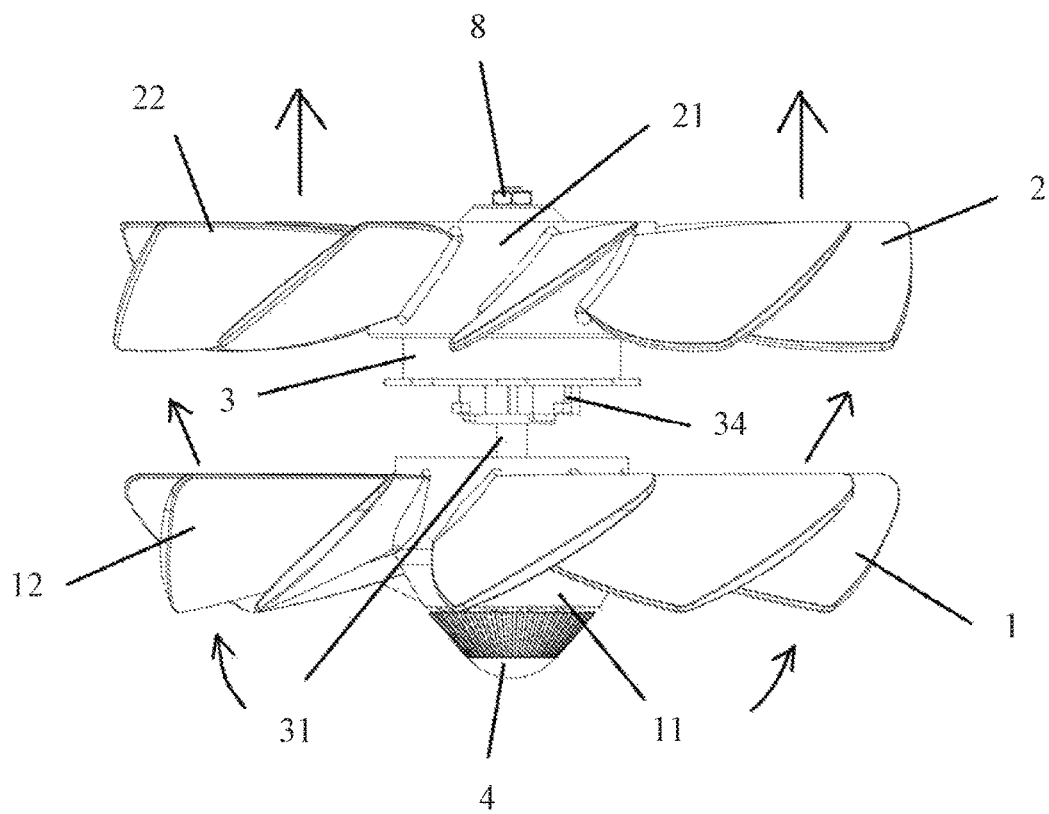
FIG. 2 is an illustrative view showing a structure of a blower device according to an exemplary embodiment.

With reference to FIGS. 1-4, exemplary embodiments of the disclosure provide a blower device 101 for use in an air purifier 102, and an air purifier 102 using the blower device 101. As shown in FIGS. 1-2, in the present embodiment, the blower device 101 comprises a first fan 1 and a second fan 2, which are arranged sequentially in the air blowing direction at an interval. The first fan 1 and the second fan 2 are mounted coaxially and driven synchronously by a motor 3. The first fan 1 and the second fan 2 are disposed so that the second fan 2 is on top of the first fan 1, achieving a bottom-to-up air blowing. In some other embodiments, the two fans may be disposed at any angles with respect to each other. By arranging the two fans at an interval and having them be driven synchronously by one motor 3, the air blowing may be improved effectively, such that the air purification may be improved.

Figure 3:
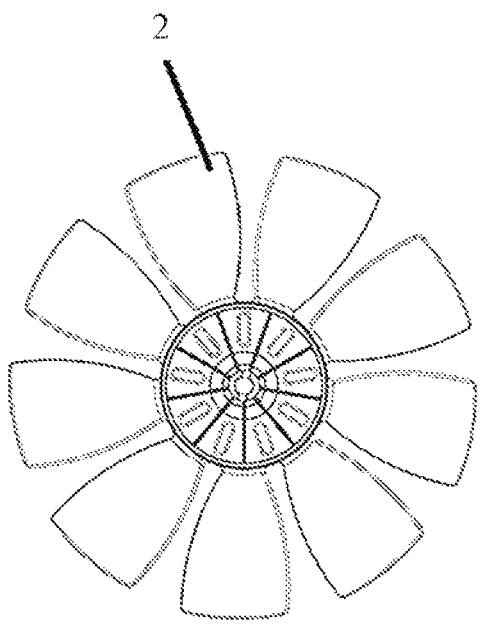
FIG. 3 is an illustrative view showing a top view structure of a second fan according to an exemplary embodiment.
Figure 4:
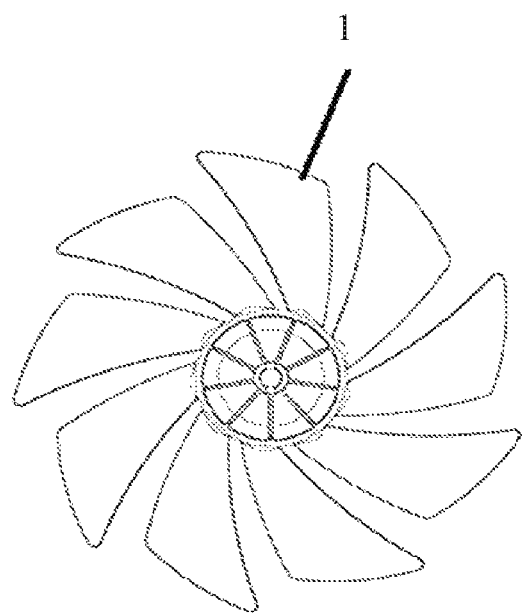
FIG. 4 is an illustrative view showing a top view structure of a first fan according to an exemplary embodiment.

In one embodiment, the blower device 101 may be designed such that the first fan 1 generates a blowing pressure greater than the second fan 2, and that the second fan 2 has a blowing rate higher than that of the first fan 1. In the present embodiment, since the first fan 1 generates a greater blowing pressure, the suction force of the blower device 101 may be improved. And the design may gather a lot of air at the intake side, such that the air may be blown by the second fan 2 at a high rate, and the blowing efficiency of the blower device 101 may be improved. In some embodiments, the air pressure and rate may be achieved by a two-fan design. For example, in an exemplary embodiment, as shown in FIGS. 3 and 4, the first fan 1 may be a mixed flow fan, and the second fan 2 may be an axial flow fan. The mixed flow fan is a fan that produces an air flow between an axial air flow produced by an axial flow fan and a centrifugal flow produced by a centrifugal fan. In one embodiment, the mixed flow fan may be characterized as producing a greater air pressure and lower blowing rate than that of the axial flow fan. In some embodiments, the desired air blowing rate and air pressure of the fans consistent with embodiments of the disclosure may be achieved by means of particularly designed structure for the vanes of the two fans, and etc.

In some embodiments, to facilitate the two fans 1 and 2 to be driven synchronously by one motor, the motor 3 may be a dual-shaft motor, e.g., a motor having two rotary shafts extending in opposite directions, such as a first rotary 31 and a second rotary shaft 32 shown in FIG. 1, such that the two fans 1 and 2 may be driven synchronously. Further, the dual-shaft motor 3 is mounted between the rotary centers of the first fan 1 and second fan 2, such that the space may be fully utilized and the height of the blower device 101 can be reduced along the air blowing direction 103. In the present embodiment, the two rotary shafts 31 and 32 of the motor 3 may be driven by the same rotor, i.e., the two fans are rotated in the same direction and have the same air blowing direction. In some other embodiments, the two shafts of the motor 3 may be rotated in the opposite directions, such that the two fans have opposite rotary directions. In this case, the vanes of the first fan 1 and the second fan 2 can be mounted in opposite directions such that the two fans can have the same air blowing direction.

In some embodiments, a first hub 11 of the first fan 1 is connected to the first rotary shaft 31 of the motor 3. A second hub 21 of the second fan 2 is connected to the second rotary shaft 32 of the motor 3. A housing 33 of the motor 3 is partially disposed into the first hub 11 or the second hub 21. An exposed end of the housing 33 is provided with a mounting portion 34 for being mounted into the air purifier 102. In the illustrated embodiment, by partially mounting the motor 3 into one of the two hubs 11, 21, the space of the two fans along the air blowing direction 103 may be utilized more efficiently, and the height of the blower device 101 may be reduced along the air blowing direction 103. In addition, the mounting portion 34 provided at an exposed end may facilitate mounting the blower device 101 into the air purifier 102.

Referring to FIG. 1, the air purifier 102 of the present exemplary embodiment further comprises a purifier body 5 and an exhaust channel 6 provided on the purifier body 5. The purifier body 5 includes a filter core (not shown), a water chamber (not shown), and other members for filtering and humidifying the air. In order to blow out the purified air, the blower device 101 is mounted within the exhaust channel 6. Thus, the air blowing direction 103 in the present embodiment is the direction from the purifier body 5 toward the exhaust channel 6. The first fan 1 is provided near the purifier body 5, and the second fan 2 is provided near the air outlet port of the exhaust channel 6. In the present embodiment, to mount the blower device 101 into the air purifier 102 and detach it for maintenance, the blower device 101 is detachably mounted into the exhaust channel 6. In some embodiments, the blower device 101 may be permanently fixed into the exhaust channel 6.

As shown in FIG. 1, the housing 33 of the motor 3 is partially mounted into the second hub 21, and the end extending out of the second hub 21 is provided with the mounting portion 34. The exhaust channel 6 is provided a mounting annular seat 7 therein. The first rotary shaft 31 is passed through a central through hole of the mounting annual seat 7 and detachably connected with the second fan 2. The mounting portion 34 is snapped onto the mounting annular seat 7. In the illustrated embodiment, the blower device 101 can be mounted via the air outlet port. For example, firstly the motor 3 and the second fan 2 may be assembled, the first rotary shaft 31 may then be passed through the mounting annular seat 7 through the air outlet port of the exhaust channel 6, and then the first rotary shaft 31 and the first fan 1 are assembled from a side of the purifier body 5.

The mounting annular seat 7 may be fixed to the center portion of the exhaust channel 6 through connection ribs circumferentially provided at intervals, or through an annular plate fixed to the exhaust channel 6. The detachable connection between the mounting portion 34 and the mounting annular seat 7 may be achieved by various manners so as to facilitate assembling of the both. For example, a plurality of snapping blocks may be arranged along an outer circumference of the mounting portion 34, and a snapping groove may be provided on the mounting annular seat 7, such that snapping connection between the snapping blocks and the snapping groove can be achieved by the circumferential rotation of the snapping blocks within the snapping groove, and the operation is easy. In some embodiments, the snapping connection may be achieved through other manners. In some embodiments, the mounting portion 34 and the mounting annular seat 7 may be connected by a threading connection.

In the illustrated embodiment, the second fan 2 and the second rotary shaft 32 may be connected by a detachable connection. For example, the second rotary shaft 32 is passed through the second hub 21 and forms a profile surface connection with the second hub 21. The profile surface connection is a hole-shaft fitting manner of non-circular cross section, which can transmit the torque without limiting the axial movement. For example, the corresponding portion of the second rotary shaft 32 may be a rectangular shaft having a rectangular cross section, or a corresponding fitting profile surface of the second rotary shaft 32 may be formed by machining. In some embodiments, the connection between the second fan 2 and the second rotary shaft 32 may be achieved by spline, threading or other manners. For further fastening the second fan 2 to the second rotary shaft 32, the end of the second rotary shaft 32 is detachably connected with a limiting nut 8.

Furthermore, similarly, the first rotary shaft 31 is passed through the first hub 11 and forms a profile surface connection with the first hub 11, facilitating the assembling and detaching of the both. In order to axially limit the connection between the first rotary shaft 31 and the first hub 11, the end of the first rotary shaft 31 is detachably connected with a guiding cap 4. In the present embodiment, in addition to limiting the first fan 1, the guiding cap 4 also serves to guide the air flow. As shown in FIGS. 1 and 2, since the guiding cap 4 is provided at the center of an end of the first hub 11 close to air purifier body 5, the air flow may be guided to a plurality of first vanes 12 connected to the first hub 11 at circumferential intervals, such that the air blowing efficiency may be improved while the noise may be reduced. In some embodiments, to uniformly guide the air flow, the guiding cap 4 is formed as a conical cap with an arced head.

In the illustrated embodiment, the exhaust channel 6 comprises a first air channel 61 and a second air channel 62 connected in the air blowing direction 103. The first air channel 61 is formed as a conical structure having a cross-section area increasing gradually in the air blowing direction 103. The second air channel 62 is formed as a cylindrical structure. Such design allows fully using the transverse space for the purifier body 5 near the first air channel 61, reducing the transverse size of the purifier body 5 to reduce the footprint of the air purifier 102. By gradually increasing the cross-section area of the first air channel 61 from the end connected to air purifier body 5 to the end connected to the second air channel, the second air channel 62 with a larger cross-section area can be used, ensuring a higher air blowing rate and effectiveness of the air purifier 102.

With reference to FIG. 1 again, the first fan 1 is positioned at the first air channel 61, and the second fan 2 is positioned at the second air channel 62. A side edge of the guiding cap 4 positioned at the proximal center of the first hub 11 can be substantially parallel to a side wall of the first air channel 61, thereby the air flow can be guided smoothly by the guiding cap 4 to the first vane 12 as shown by the arrow in FIG. 2, reducing the noise while ensuring a high air intake rate. In the illustrated embodiment, as shown by the arrows in FIG. 2, the first fan 1 has an exhaust direction in the axial direction and inclined outwards, and the second fan 2 has an exhaust direction in the axial direction. That is, the first fan 1 has substantially the same air blowing direction and exhaust direction as the second fan 2, such that the first fan 1 blows air for the second fan 2 while further reducing the noise. The exhaust direction of the first fan 1 can be achieved by arranging the first vanes 12 slightly inclined towards the proximal side in the axial direction.

In order to fully utilize the air flow rate provided by the first fan 1, as shown in FIGS. 1 and 2, in the present embodiment, the first fan 1 and the second fan 2 have the same diameter. In this case, the second fan 2 can blow out the air in the air blowing rate provided by the first fan 1. In some embodiments, the first fan 1 may have an exhaust direction inclined outwards and a diameter slightly smaller than that of the second fan 2. The difference of their sizes between the first fan 1 and the second fan 2 may depend on the outward inclination of the second fan 2. That is, in case that the exhaust rate of the first fan 1 can be fully utilized, the first fan 1 may be designed to be slightly smaller than the second fan 2, which may also facilitate the accommodation of the first fan 1 into the conical tapered structure of the first air channel 61.

Further, the space between the two fans affects the noise generated by the air blower device 101. The noise will be smaller when the two fans become more distanced. However, a large distance between the two fans may not only take up the space but also reduce the cooperation of the two fans. Therefore, in the present embodiment, the distance between the first fan 1 and the second fan 2 is about 4 mm to 200 mm.

Conceptually, the two fans 1 and 2 provided at an interval may be deemed as one large fan having a larger thickness. The middle area of the large fan being cut to form two fans 1 and 2. As shown in FIGS. 3 and 4, the first fan 1 has the same number of the first vanes 12 as the number of the second vanes 22 of the second fan 2. For example, the number of the vanes may be nine. In order that the air flow generated by the two fans provided at an interval can be substantially as smooth as that generated by one fan, in the neighboring first vane 12 and second vane 22, the second vane 22 is staggered backwards in the circumferential direction from the first vane 12. The neighboring first vane 12 and second vane 22 means two vanes with smallest distance. The vanes are so designed because the air flowing to the space between the two fans 1 and 2 may be delayed by a resistance force. In some embodiments, the second vane 22 is staggered backwards in the circumferential direction, i.e., in the rotary direction, from the first vane 12. This allows the delayed air flowing smoothly into the second fan 2, such that a continuous and smooth air flow is formed. The designs also improve the air blowing capability of the air blowing device 101 while reducing the noise.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A blower device for use in an air purifier, comprising:
a first fan and a second fan which have a same air blowing direction and are arranged sequentially in the air blowing direction at an interval,
the first fan and the second fan being mounted coaxially and driven synchronously by a motor,
the first fan being a mixed flow fan configured to produce an air flow between an axial air flow produced by an axial flow fan and a centrifugal flow produced by a centrifugal fan, and
the second fan being an axial flow fan,
wherein the first fan generates a blowing pressure greater than the second fan, and has a blowing rate lower than the second fan.

2. The blower device according to claim 1, wherein the motor is a dual-shaft motor mounted between rotary centers of the first fan and the second fan.

3. The blower device according to claim 2, wherein
a first hub of the first fan is connected to a first rotary shaft of the motor;
a second hub of the second fan is connected to a second rotary shaft of the motor;
a housing of the motor is partially disposed into the first hub or the second hub; and
an exposed end of the housing is provided with a mounting portion for mounting into the air purifier.

4. The blower device according to claim 3, wherein the first hub of the first fan is provided with a guiding cap at a proximal center, for guiding the air flow to a plurality of first vanes connected to the first hub at circumferential intervals.

5. The blower device according to claim 4, wherein the guiding cap is formed as a conical cap with an arced head.

6. The blower device according to claim 1, wherein the first fan is arranged closer to an air purifier body and has a diameter equal to or smaller than a diameter of the second fan.

7. The blower device according to claim 1, wherein a distance between the first fan and the second fan is in a range of 4 mm to 200 mm.

8. The blower device according to claim 6, wherein
the first fan has a number of first vanes and the second fan has the same number of second vanes; and
one of the second vanes having a closest distance with one of the first vanes is staggered backwards in a circumferential direction from the one of the first vanes.

9. An air purifier, comprising:
a purifier body;
an exhaust channel provided on the purifier body; and
a blower device provided in the exhaust channel, the blower device including a first fan and a second fan which have a same air blowing direction and are arranged sequentially in the air blowing direction at an interval, the first fan and the second fan being mounted coaxially and driven synchronously by a motor, the first fan being a mixed flow fan configured to produce an air flow between an axial air flow produced by an axial flow fan and a centrifugal flow produced by a centrifugal fan, and the second fan being an axial flow fan, wherein the first fan generates a blowing pressure greater than the second fan, and has a blowing rate lower than the second fan.

10. The air purifier according to claim 9, wherein the exhaust channel includes a first air channel and a second air channel connected in the air blowing direction;

the first air channel is disposed next to the purifier body and has a conical structure having a cross-section area increasing gradually in the air blowing direction;

the second air channel has a cylindrical structure; and the first fan is disposed at the first air channel and the second fan is disposed at the second air channel.

11. The air purifier according to claim 10, wherein the first fan has an exhaust direction in an axial direction and inclined outwards, and the second fan has an exhaust direction in the axial direction.

12. An air purifier, comprising:

a purifier body;

an exhaust channel provided on the purifier body; and a blower device provided in the exhaust channel and including a first fan and a second fan which have a same blowing direction and are arranged sequentially in the air blowing direction at an interval;

the first fan and the second fan being mounted coaxially and driven synchronously by a motor, wherein the motor is a dual-shaft motor mounted between rotary centers of the first fan and the second fan;

the first fan being a mixed flow fan configured to produce an air flow between an axial air flow produced by an axial flow fan and a centrifugal flow produced by a centrifugal fan, and the second fan being an axial flow fan, wherein the first fan generates a blowing pressure greater than the second fan, and has a blowing rate lower than the second fan.

13. The air purifier according to claim 12, wherein a first hub of the first fan is connected to a first rotary shaft of the motor;

a second hub of the second fan is connected to a second rotary shaft of the motor;

a housing of the motor is partially disposed into the second hub;

an end of the housing exposed from the second hub is provided with a mounting portion;

the exhaust channel is provided with a mounting annular seat;

the first rotary shaft is passed through a central through hole of the mounting annual seat and detachably connected with the first fan; and the mounting portion is detachably connected to the mounting annular seat.

14. The air purifier according to claim 13, wherein the first rotary shaft is passed through the first hub and forms a profile surface connection with the first hub; and an end of the first rotary shaft is detachably connected with a guiding cap.

15. The air purifier according to claim 13, wherein the second rotary shaft is passed through the second hub and forms a profile surface connection with the second hub; and an end of the second rotary shaft is detachably connected with a limiting nut.

* * * * *